(12) United States Patent
Cheluvaraju et al.

(10) Patent No.: US 10,699,417 B2
(45) Date of Patent: Jun. 30, 2020

(54) METHOD AND SYSTEM FOR ACQUISITION OF OPTIMAL IMAGES OF OBJECT IN MULTI-LAYER SAMPLE

(71) Applicant: SIGTUPLE TECHNOLOGIES PRIVATE LIMITED, Bangalore (IN)

(72) Inventors: Bharath Cheluvaraju, Bangalore (IN); Apurv Anand, Bangalore (IN); Rohit Kumar Pandey, Bangalore (IN); Tathagato Rai Dastidar, Bangalore (IN); Abdul Aziz, Kolkata (IN); Apoorva Jakalannanavar Halappa Manjula, Sirsi (IN)

(73) Assignee: Sigtuple Technologies Private Limited, Bangalore (IN)

( * ) Notice: Subject to any disclaimer, the term of this patent is extended or adjusted under 35 U.S.C. 154(b) by 0 days.

(21) Appl. No.: 15/746,704

(22) PCT Filed: Oct. 3, 2017

(86) PCT No.: PCT/IB2017/056094
§ 371 (c)(1),
(2) Date: Jan. 22, 2018

(87) PCT Pub. No.: WO2018/065897
PCT Pub. Date: Apr. 12, 2018

(65) Prior Publication Data
US 2020/0090340 A1 Mar. 19, 2020

(30) Foreign Application Priority Data
Oct. 3, 2016 (IN) .............................. 201641033732

(51) Int. Cl.
*G06K 9/00* (2006.01)
*G06T 7/194* (2017.01)
(Continued)

(52) U.S. Cl.
CPC ............ *G06T 7/194* (2017.01); *G02B 21/367* (2013.01); *G06K 9/0014* (2013.01);
(Continued)

(58) Field of Classification Search
CPC combination set(s) only.
See application file for complete search history.

(56) References Cited

U.S. PATENT DOCUMENTS

| 6,438,261 B1 * | 8/2002 | Moshe | G01N 15/1475 382/133 |
| 2005/0259864 A1 * | 11/2005 | Dickinson | G06K 9/00134 382/154 |

(Continued)

*Primary Examiner* — Alex Kok S Liew
(74) *Attorney, Agent, or Firm* — Foley & Lardner LLP

(57) ABSTRACT

Embodiments of present disclosure discloses system and method for acquisition of optimal images of object in multi-layer sample. Initially, images for FOV of multi-layer sample comprising objects are retrieved. Each of images are captured by varying focal depth of image capturing unit associated with system. Further, objects associated with multi-layer sample in FOV are identified. For identification, cumulative foreground mask of FOV is obtained based on adaptive thresholding performed on foreground image of FOV. Based on contour detection performed on cumulative foreground mask of FOV, object masks, corresponding to objects, is obtained for identifying objects. Further, sharpness of each of images associated with each of object masks is computed. Based on sharpness, optimal images from images for each of objects is selected for acquisition of optimal images of objects in multi-layer sample.

22 Claims, 12 Drawing Sheets

(51) Int. Cl.
*G02B 21/36* (2006.01)
*G06T 1/00* (2006.01)
*G06T 5/00* (2006.01)
*G06T 7/136* (2017.01)
*G06T 7/11* (2017.01)
*G06T 7/70* (2017.01)
*G06T 7/50* (2017.01)
*G06T 5/50* (2006.01)

(52) U.S. Cl.
CPC ............ *G06T 1/0007* (2013.01); *G06T 5/003* (2013.01); *G06T 5/50* (2013.01); *G06T 7/11* (2017.01); *G06T 7/136* (2017.01); *G06T 7/50* (2017.01); *G06T 7/70* (2017.01); *G06T 2207/10028* (2013.01); *G06T 2207/10056* (2013.01)

(56) References Cited

U.S. PATENT DOCUMENTS

| | | | |
|---|---|---|---|
| 2006/0050948 A1* | 3/2006 | Sumida | G01N 15/1463 382/133 |
| 2012/0099801 A1* | 4/2012 | Shaw | G06T 5/003 382/263 |
| 2016/0350914 A1* | 12/2016 | Champlin | G06T 7/0012 |

* cited by examiner

METHOD AND SYSTEM FOR ACQUISITION OF OPTIMAL IMAGES OF OBJECT IN MULTI-LAYER SAMPLE

CROSS-REFERENCE TO RELATED APPLICATIONS

The present application is a National Stage of PCT Application No. PCT/IB2017/056094, filed Oct. 3, 2017, which claims priority to Indian Patent Application No. 201641033732, filed Oct. 3, 2016. The contents of both applications are incorporated herein by reference in their entirety.

TECHNICAL FIELD

The present subject matter is related in general to the field of image processing, more particularly, but not exclusively to a system and method for acquisition of one or more optimal images of an object in a multi-layer sample.

BACKGROUND

Classification of cells or objects in a sample or a specimen requires a detailed analysis of the sample. The sample may be placed under a microscope and physically examined by a medical expert for the classification. With advancement in field of image processing, automated systems for the analysis and the classification are implemented for the sample. However, for a multi-layer sample comprising two or more layers, the objects may be suspended across the two or more layers depending on specific gravity of each of the objects. Existing automated systems disclose to convert the multi-layer sample to mono-layer samples. Every layer of the two or more layers in the multi-layer sample may be separately generated, analysed and classified. However, convening of the multi-layer sample to the mono-layer samples may be an extremely complex and expensive procedure. Also, a need for analysis of every layer, separately, makes the procedure tedious.

Some of the existing systems disclose to analyse multi-layer sample without the need for converting the multi-layer sample to the mono-layer samples. However, since the objects are suspended at different depths levels of the two or more layers, determining focus value for the objects at the corresponding depths may be difficult. It may also be difficult to digitize the multi-layer sample under the microscope as it may be impossible to capture an image with all the objects in focus.

In some existing systems, one or more images of the multi-layer sample may be captured and processed for identifying the objects present in the multi-layer sample. The identified objects are analysed and provided for the classification. One or more techniques for identifying the objects may be implemented. However, by implementing the one or more techniques, smaller objects may not be identified. Also, in scenario where multiple objects are suspended across multiple depths in same region of interest, the objects at deeper depth of the two or more layers may be missed out or may not be identified. Hence, the identification of the objects may not be accurate and further manual analysis by the medical expert may be required.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure relates to method for acquisition of one or more optimal images of an object in a multi-layer sample. Initially, plurality of images for a Field Of View (FOV) from one or more FOVs of a multi-layer sample comprising one or more objects are retrieved. Each of the plurality of images are captured by varying focal depth of an image capturing unit associated with the optimal image acquisition system. Further, the one or more objects associated with the multi-layer sample in the FOV are identified. For the identification, a cumulative foreground mask of the FOV is obtained based on adaptive thresholding performed on a foreground image of the FOV. Based on the contour detection performed on the cumulative foreground mask of the FOV, one or more object masks, corresponding to the one or more objects, is obtained for identifying the one or more objects. Further, sharpness of each of the plurality of images associated with each of the one or more object masks is computed. Based on the sharpness, one or more optimal images from the plurality of images for each of the one or more objects in the FOV is selected for acquisition of the one or more optimal images of an object from the one or more objects in the multi-layer sample.

In an embodiment, the present disclosure relates to an optimal image acquisition system for acquisition of one or more optimal images of an object in a multi-layer sample. The optimal image acquisition system comprises a processor and a memory communicatively coupled to the processor. The memory stores processor-executable instructions, which, on execution, cause the processor to acquire the one or more optimal images of the object in the multi-layer sample. Initially, plurality of images for a FOV from one or more FOVs of a multi-layer sample comprising one or more objects are retrieved. Each of the plurality of images are captured by varying focal depth of an image capturing unit associated with the optimal image acquisition system. Further, the one or more objects associated with the multi-layer sample in the FOV are identified. For the identification, a cumulative foreground mask of the FOV is obtained based on adaptive thresholding performed on a foreground image of the FOV. Based on the contour detection performed on the cumulative foreground mask of the FOV, one or more object masks, corresponding to the one or more objects, is obtained for identifying the one or more objects. Further, sharpness of each of the plurality of images associated with each of the one or more object masks is computed. Based on the sharpness, one or more optimal images from the plurality of images for each of the one or more objects in the FOV is selected for acquisition of the one or more optimal images of an object from the one or more objects in the multi-layer sample.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which:

Figure 1:
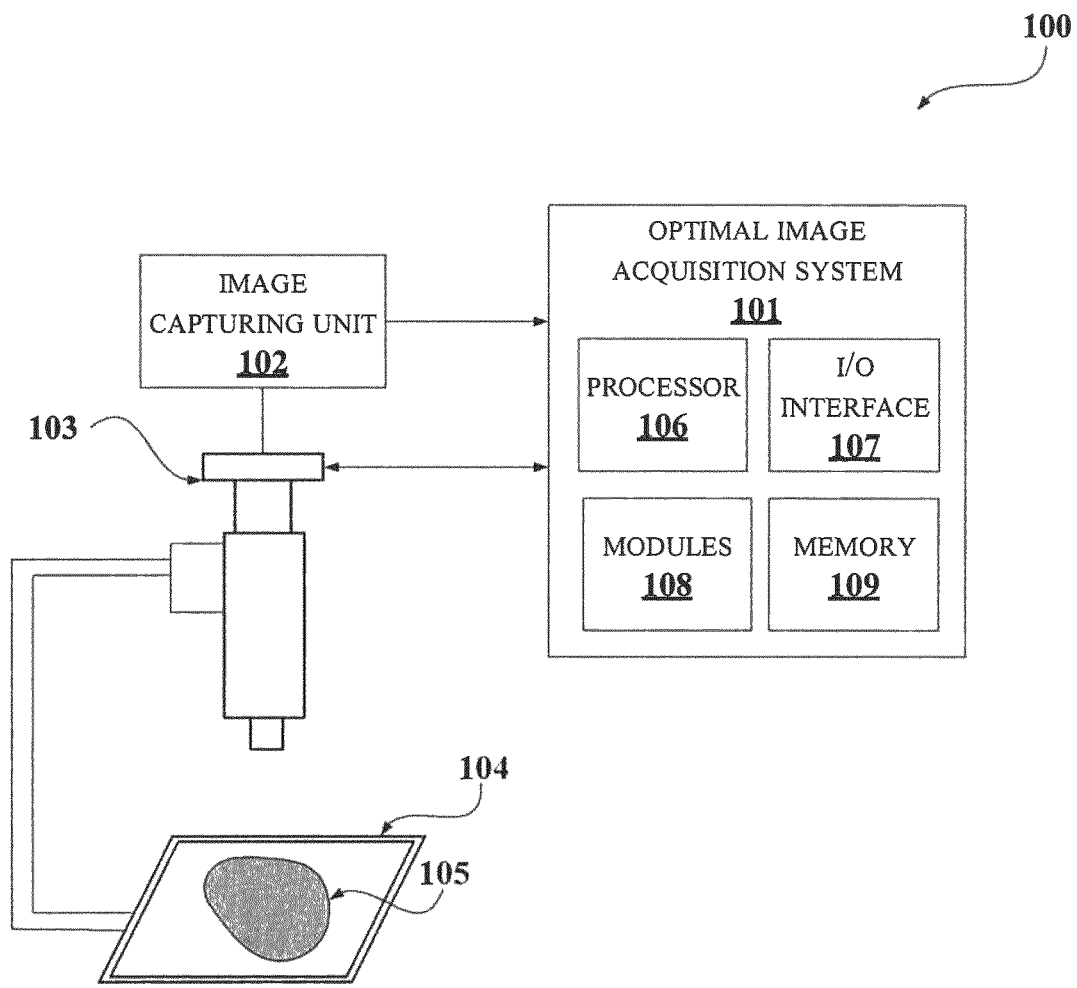
FIG. 1 illustrates an exemplary environment for acquisition of one or more optimal images of an object in a multi-layer sample in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The terms "includes", "including", or any other variations thereof, are intended to cover a non-exclusive inclusion, such that a setup, device or method that includes a list of components or steps does not include only those components or steps but may include other components or steps not expressly listed or inherent to such setup or device or method. In other words, one or more elements in a system or apparatus proceeded by "includes . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Usually a transparent or a translucent sample or a specimen which is to be tested under a microscope may comprise multiple layers at corresponding depth levels. Such sample may also be referred as a multi-layer sample and one or more objects in the multi-layer sample may be suspended across the multiple layers. Due to specific gravity of each of the one or more objects, each of the one or more objects may be present at different depth levels. One or more optimal images for optimal representation of each of the one or more objects helps in easy analysis and classification of the corresponding object in the multi-layer sample. For obtaining the one or more optimal image, accurate identification of each of the one or more objects may be necessary. In the present disclosure, the one or more objects in the multi-layer sample are identified by, initially, capturing plurality of images of a FOV of the multi-layer sample at varying focal depth. Further, identification of the one or more objects in each of the plurality of images for the FOV comprises performing adaptive thresholding a foreground image of the FOV. By the adaptive thresholding, cumulative foreground mask of the FOV may be obtained. Further, the one or more objects are identified by performing contour detection on the cumulative foreground mask. By the contour detection, one or more object masks may be obtained. Each of the one or more object masks correspond to the one or more objects. In the present disclosure, the one or more objects suspended at deeper depths, smaller objects and objects that are one beneath the other may be retrieved. Sharpness of the plurality of the images associated with the one or more objects masks may be computed and based on the sharpness, the one or more optimal images of the objects may be selected.

FIG. 1 illustrates an exemplary environment 100 for acquisition of one or more optimal images of an object in a FOV of a multi-layer sample 105. The multi-layer sample may comprise one or more objects suspended across multiple layers at different depth in a FOV. The present disclosure discloses to acquire one or more optimal images of each of the one or more objects. The exemplary environment 100 comprises an optimal image acquisition system 101, an image capturing unit 102, a microscope 103, a stage 104 and the multi-layer sample 105. The multi-layer sample 105 for which the one or more optimal images of the object from the one or more objects is to be acquired may be placed on the stage 104 under the microscope 103 (as shown in the figure). The multi-layer sample 105 may be one of a transparent sample and a translucent sample which is to be examined. In an embodiment, the multi-layer sample 105 may also be referred to as a multi-layer specimen. The multi-layer sample or the multi-layer specimen may include, but is not limited to, urine, blood, semen, tissue, smear, body fluid, biological fluid, cells, biopsy and so on, obtained from a subject. The subject may be a human being, an animal or a plant. The multi-layer sample 105 is placed on the stage 104 to enable examination or investigation of the multi-layer sample 105 through the microscope 103. The microscope 103 may focus at a region of the multi-layer sample 105 at any instant of time. The region focussed by the microscope 103 may be referred to as FOV or Region of Interest (ROI). The multi-layer sample 105 may comprise one or more FOVs based on the focus of the microscope 103. The acquisition of the one or more optimal images of the one or more objects may be performed for each of the one or more FOVs in the multi-layer sample 105. The one or more optimal images from each of the one or more FOVs may be acquired by moving one of the microscope 103 and the stage 104 horizontally such that the microscope 103 focuses on the corresponding FOV.

The image capturing unit 102 associated with the microscope 103 and the optimal image acquisition system 101 may be configured to capture one of image and video of the multi-layer sample 105. The captured image or video is provided to the optimal image acquisition system 101 for acquiring the one or more optimal images.

Further, the optimal image acquisition system 101 includes a processor 106, I/O interface 107, one or more modules 108 and a memory 109. In some embodiments, the memory 109 may be communicatively coupled to the processor 106. The memory 109 stores processor executable instructions, which, on execution, may cause the optimal image acquisition system 101 to acquire the one or more optimal images of the one or more objects in the FOV of the multi-layer sample 105. The optimal image acquisition system 101 may be implemented in a variety of computing systems, such as a laptop computer, a desktop computer, a Personal Computer (PC), a notebook, a smartphone, a tablet, e-book readers, a server, a network server, and the like.

In an embodiment, the optimal image acquisition system 101 may communicate with the image capturing unit 102 and the microscope 103 through a communication network 105 (not shown in the figure). The communication network may include, without limitation, a direct interconnection, Local Area Network (LAN), Wide Area Network (WAN), wireless network (e.g., using Wireless Application Protocol), Internet, and the like. In an embodiment, the optimal image acquisition system 101 may receive data from the image capturing unit 102, the microscope 103 and other associated received data for acquiring the one or more optimal images, through the I/O interface 107. Also, the optimal image acquisition system 101 may transmit data to the microscope 103 and other associated transmitted data for acquiring the one or more optimal images, through the I/O interface 107. The I/O interface 107 may be coupled with the processor 106 of the optimal image acquisition system 101.

In an embodiment, the data may be received and transmitted via the communication network.

In an embodiment, at least one of the image capturing unit 102 and the optimal image acquisition system 101 may be external modules coupled to the microscope 103. In another embodiment, at least one of the image capturing unit 102 and the optimal image acquisition system 101 may be embedded in the microscope 104 for acquiring the one or more optimal images. In an embodiment, the image capturing unit 102 may be placed on ocular of the microscope 103 for capturing the plurality of images.

For acquiring the one or more optimal images of the object in the multi-layer sample 105, the image capturing unit 102 is positioned at a homing position with respect to the multi-layer sample 105. In an embodiment, the homing position may be position at which the image capturing unit 102 may be placed with maximum possible distance away from the multi-layer sample 105. The homing position may be based on one or more hardware specifications of the microscope 103. In an embodiment, the microscope 103 along with the image capturing unit 102 is positioned at the homing position for focusing at a FOV of the multi-layer sample 105. In an embodiment, the homing position may be determined manually adjusting focus knob of the microscope 103 by a medical expert. The medical expert may be any person who is an expert in handling the microscope 103 and the multi-layer sample 105. In an embodiment, a sensor may be coupled with at least one of the microscope 103, the image acquisition unit 102 and the stage 104 holding the multi-layer sample 105 (not shown in the figure) for sensing if the image capturing unit 102 is at the homing position. In an embodiment, one or more data from the sensor may be used for automatically adjusting the image capturing unit 102 at the homing position, without the intervention of the medical expert. In an embodiment, data associated with the homing position may be provided to the medical expert, based on which the medical expert adjusts the image capturing unit 102 manually.

Upon positioning the image capturing unit 102 to the homing position, the image capturing unit 102 is configured to capture plurality of images for the respective FOV. The plurality of images may be captured by varying focal depth of the objective lenses of the image capturing unit 102. The focal depth of the image capturing unit 102 is varied at a predefined step size from a first focal depth to a second focal depth to capture the plurality of images. Thereby, each of the plurality of images is captured at different depth of the multi-layer sample 105. In an embodiment, the first focal depth is a focal depth at which image sharpness of an image captured at said focal depth is greater than a predefined image sharpness. In an embodiment, the second focal depth is determined based on at least one of the first focal depth, the predefined step size and number of the plurality of images to be captured. In an embodiment, a video of the multi-layer sample may be captured by the image capturing unit 102 by varying the focal depth of the objective lenses of the image capturing unit. Each frame in the captured video may be retrieved by the optimal image acquisition system. Each frame of the video may correspond to each of the plurality of images at corresponding focal depth. In an embodiment, the captured video may be sampled into set of images based on frames-per-second and the set of images may correspond to the plurality of images.

Upon capturing the plurality of images, the one or more objects associated with the multi-layer sample 105 in the FOV are identified. For the identification, a cumulative foreground mask of the FOV is obtained based on adaptive thresholding performed on a foreground image of the FOV. For obtaining the foreground image, the foreground estimate associated with each of the plurality of images of the FOV is obtained based on background modelling performed on corresponding image from the plurality of images. Further, cumulative addition of the foreground estimate associated with each of the plurality of images is performed to obtain the foreground image of the FOV. Upon obtaining the cumulative foreground image, contour detection may be performed on the cumulative foreground mask of the FOV to obtain one or more object masks, corresponding to the one or more objects.

Further, sharpness of each of the plurality of images associated with each of the one or more object masks is computed. In an embodiment, the plurality of images may be referred to as plurality of images patches associated with the corresponding one or more objects masks. In an embodiment, the sharpness of the each of the plurality of images is computed based on contours associated with corresponding one or more object masks. One or more techniques, known to a person skilled in the art may be implemented for the computing the sharpness of each of the plurality of images.

Based on the computed sharpness for each of the plurality of images, one or more optimal images from the plurality of images for each of the one or more objects in the FOV is selected. In an embodiment, one or more images from the plurality of images with greater values of the sharpness may be selected to be the one or more optimal images. Thereby, the sharpness of the one or more optimal images selected from the plurality of images is greater than sharpness of other plurality of images. In an embodiment, value of sharpness of each of the plurality of images may be compared with a predefined sharpness threshold value for selecting the one or more optimal images.

The acquiring of the one or more optimal images, as disclosed in the present disclosure, may be performed for each of the one or more FOVs of the multi-layer sample 105 for acquiring the one or more optimal images for the one or more objects in each of the one or more FOVs.

Figure 2:
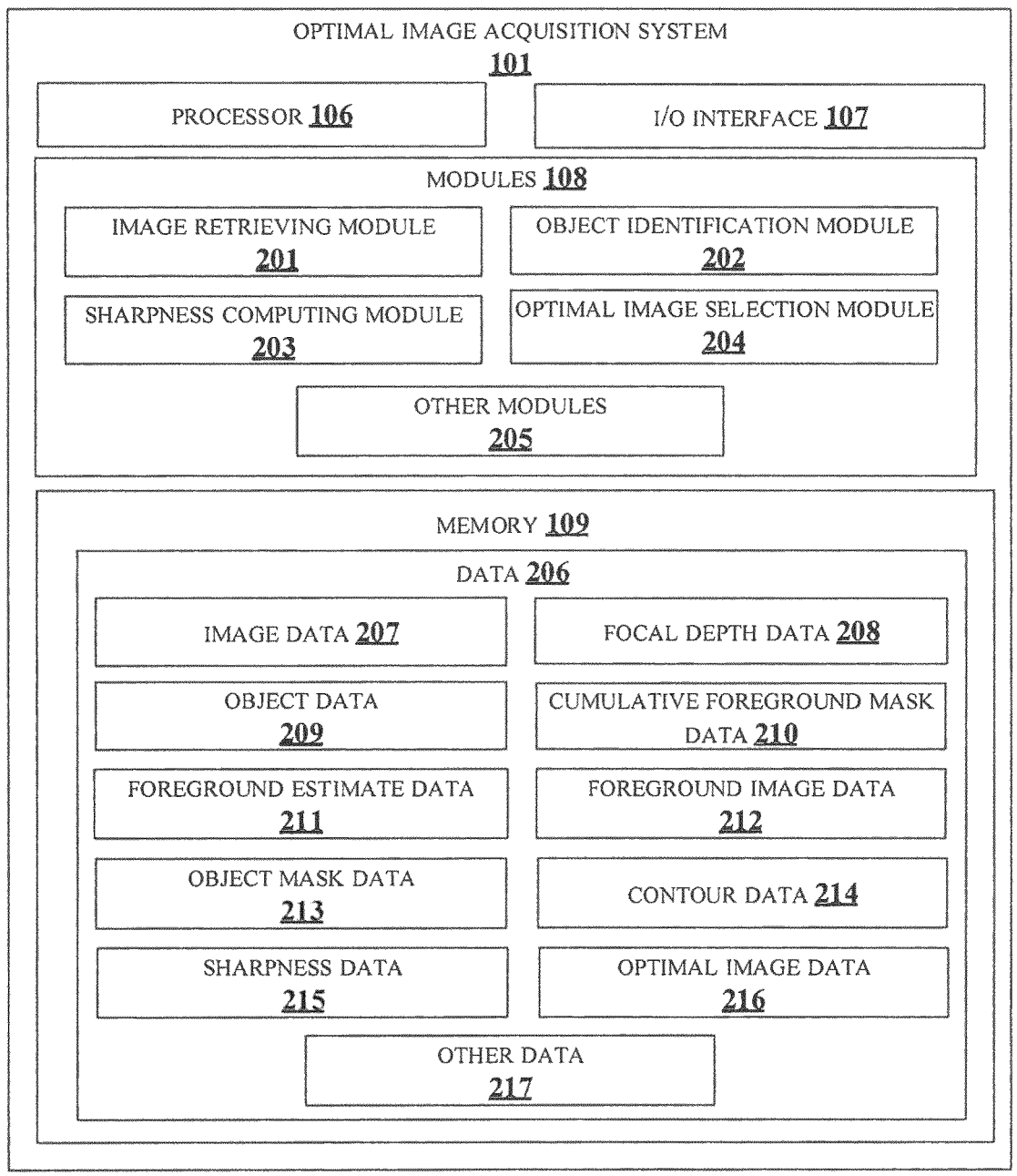
FIG. 2 shows a detailed block diagram of optimal image acquisition system for acquisition of one or more optimal images of an object in a multi-layer sample in accordance with some embodiments of the present disclosure.

FIG. 2 shows a detailed block diagram of the optimal image acquisition system 101 for acquisition of the one or more optimal images of the object in the multi-layer sample 105 in accordance with some embodiments of the present disclosure.

The data 206 in the memory 109 and the one or more modules 108 of the optimal image acquisition system 101 may be described herein in detail.

In one implementation, the one or more modules 108 may include, but are not limited to, an image retrieving module 201, an object identification module 202, a sharpness computing module 203, an optimal image selection module 204 and one or more other modules 205 associated with the optimal image acquisition system 101.

In an embodiment, the data 206 in the memory 109 may comprise an image data 210 (also referred as plurality of images 207), a focal depth data 208 (also referred as a focal depth 208), an object data 209 (also referred as one or more objects 209), a cumulative foreground mask data 210 (also referred as a cumulative foreground mask 210), a foreground estimate data 211 (also referred as a foreground estimate 211), a foreground image data 212 (also referred as a foreground image 212), an object mask data 213 (also referred as one or more object masks 213), a contour data 214 (also referred as contours 214), a sharpness data 215 (also referred as a sharpness 215), an optimal image data 216 (also referred as the one or more optimal images 216) and other data 217 associated with the optimal image acquisition system 101.

In an embodiment, the data 206 in the memory 109 may be processed by the one or more modules 108 of the optimal image acquisition system 101. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. The modules when configured with the functionality defined in the present disclosure may result in a novel hardware.

In a multi-layer sample 105, the one or more objects 209 may be suspending across the multiple layers at different depths of the multi-layer sample 105. For acquiring the one or more optimal images 216 of the one or more objects 209, image of the multi-layer sample 105 at each layer may be captured and analysed for selecting the optimal image. In the present disclosure, the image capturing unit 102 may be configured to capture the plurality of images 207 for the FOV by varying focal depth 208 of the objective lenses of the image capturing unit 102. The focal depth 208 may be varied for a range of values of the focal depth 208. In an embodiment, the focal depth 208 of the image capturing unit 102 is varied at the predefined step size from the first focal depth to the second focal depth to capture the plurality of images 207.

The first focal depth is a focal depth at which image sharpness of an image captured at said first focal depth is greater than a predefined image sharpness. In an embodiment, for determining the first focal depth, image or video in the FOV is captured by varying the focal depth 208, until an object is detected. Consider one of the captured image or a frame of the captured video (may also be referred as an image) is retrieved for determining the first focal depth. Sharpness of the image is computed using one or more techniques known to a person skilled in the art. In an embodiment, the sharpness of the image may be determined using Laplacian based method in which Laplacian value associated with the image may be computed. Computing of the Laplacian values of the image includes performing convolution of the image with a Laplacian Kernel and compute the Laplacian values for the image. The Laplacian value may be computed by transforming the image to a single colour channel. In an embodiment, the image may be transformed to one of a Red Blue Green (RBG) image, a Cyan Magenta Yellow and Key (CMYK) image, a greyscale image and the like. In an embodiment, the Laplacian value may be computed using equation 1, given below:

$$L(x, y) = \frac{\partial^2 I}{\partial^2 x} + \frac{\partial^2 I}{\partial^2 y} \tag{1}$$

where, L(x,y) is the Laplacian value of the image of 2 Dimensions (2D) with x and y coordinates.

Upon determining the Laplacian values for the image, adaptive thresholding is performed on the image. One or more techniques, known to a person skilled in the art, may be implemented for the adaptive thresholding. In an embodiment, by the adaptive thresholding, an estimate of foreground pixels and background pixels on the image may be identified. Therefore, number of pixels having pixel value 255 and number of pixels having pixel value 0 may be identified in the image. Further, normalised Laplacian Value of the image is computed using the equation 2, given below:

$$L_{norm} = \frac{L(x, y)}{P_{255}} \quad (2)$$

where, $L_{norm}$ is the normalized Laplacian value; and $P_{255}$ is the number of pixels with the pixel value 255.

In an embodiment, the normalised Laplacian value may provide the variance of Laplacian per unit of foreground in the image. From the normalized Laplacian value, the sharpness of the image may be computed. One or more techniques, known to a person skilled in the art may be implemented for determining the sharpness of the image. Further, the determined sharpness is compared with the predefined image sharpness. If the determined sharpness of the image is greater than the predefined image sharpness, it may be understood that an object is detected at the focal depth at which the image is captured. Thus, the focal depth at which the image is captured may be determined to be the first focal depth. If the determined sharpness of the image is lesser than the predefined sharpness, it may be understood that no object is detected at the focal depth at which the image is captured. Thus, the focal depth is further varied to determine the first focal depth, until the determined sharpness is greater than the predefined sharpness.

In an embodiment, the second focal depth is determined based on at least one of the first focal depth, the predefined step size and number of the plurality of images to be captured. In an embodiment, the second focal depth may be determined using equation 3 given below:

$$F_2 = F_1 + (\delta_f \times n) \quad (3)$$

where, $F_2$ is the second focal depth;

$F_1$ is the first focal depth;

$\delta_f$ is the predefined step size; and n is the number of plurality of images.

In an embodiment, the number of plurality of images may be determined considering minimum focal depth associated with the image capturing unit 102. The minimum focal depth is deepest focal depth that the image capturing unit 102 be adjusted to, without touching the multi-layer sample 105. When the image capturing unit 102 is adjusted to any focal depth greater than the minimum focal depth, the objective lenses of the image capturing unit 102 may touch the multi-layer sample. In an embodiment, the number of the plurality of images, for determining the second focal depth, may be determined using equation 4, given below:

$$n = \frac{F_1 - Fmin}{\delta_f} \quad (4)$$

where, $F_{min}$ is the minimum focal depth.

It may be known in the art that the medical expert may be aware of the minimum focal depth for determining the number of plurality of images, thereby to compute the second focal depth. In an embodiment, the medical expert may determine the predefine step size based on the minimum focal depth. In another embodiment, the predefined step size may be determined based the one or more hardware specifications associated with the microscope 103. The predefined step size may be a minimum possible change in focus depth that hardware of the at least one of the microscope 103 and the image capturing unit 102 may support.

Figure 5:
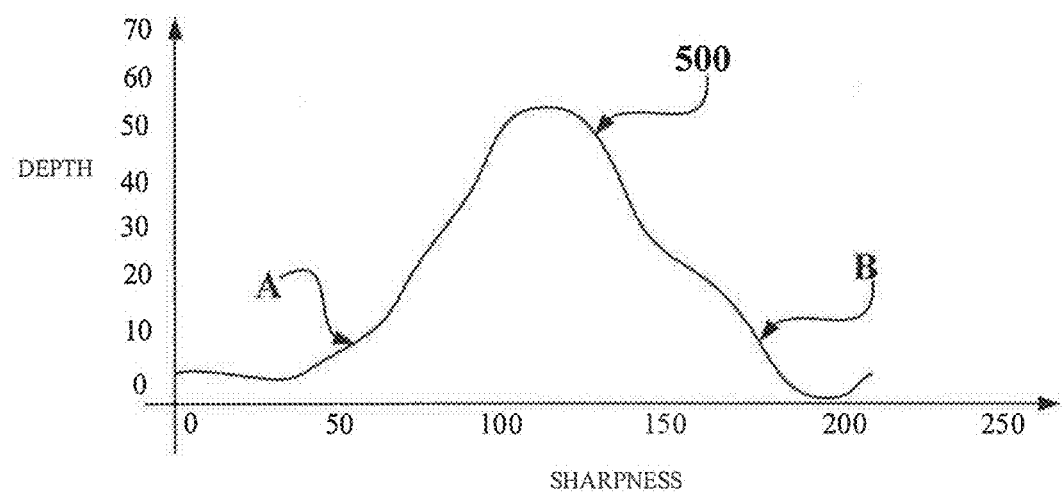
FIG. 5 shows an exemplary representation of plot illustrating variation of sharpness of an object with varying depth in a multi-layer sample in accordance with some embodiments of present disclosure.

FIG. 5 illustrates a plot 500 indicating variation of sharpness of the object with respect to the depth in the multi-layer sample 105. For any object, initial depth includes low sharpness value of the object and the sharpness may increase gradually with increase in the depth. With further increase in the depth, the sharpness begins to reduce. The number of plurality of images may be number of images that needs to be captured from point A to point B in the plot 500.

In an embodiment, the second focal depth may be determined by comparing the sharpness of each image capturing at the predefined step size from the first focal depth, with the predefined image sharpness. When the sharpness of the image is lesser than the predefined image sharpness, the focal depth at which said image is captured may be determined to be second focal depth.

In an embodiment, the predefined image sharpness may be selected based on the specimen. For example, a plot similar to the plot 500 corresponding to each of plurality of samples of a specimen may be analysed and average of sharpness value at point A from each plot may be determined. Said average value may be the predefined image sharpness used for determining the first focal depth. Similarly, average of sharpness value at point B from each plot may be determined and said average of the sharpness value may be used to determine the second focal depth.

Figure 4A:
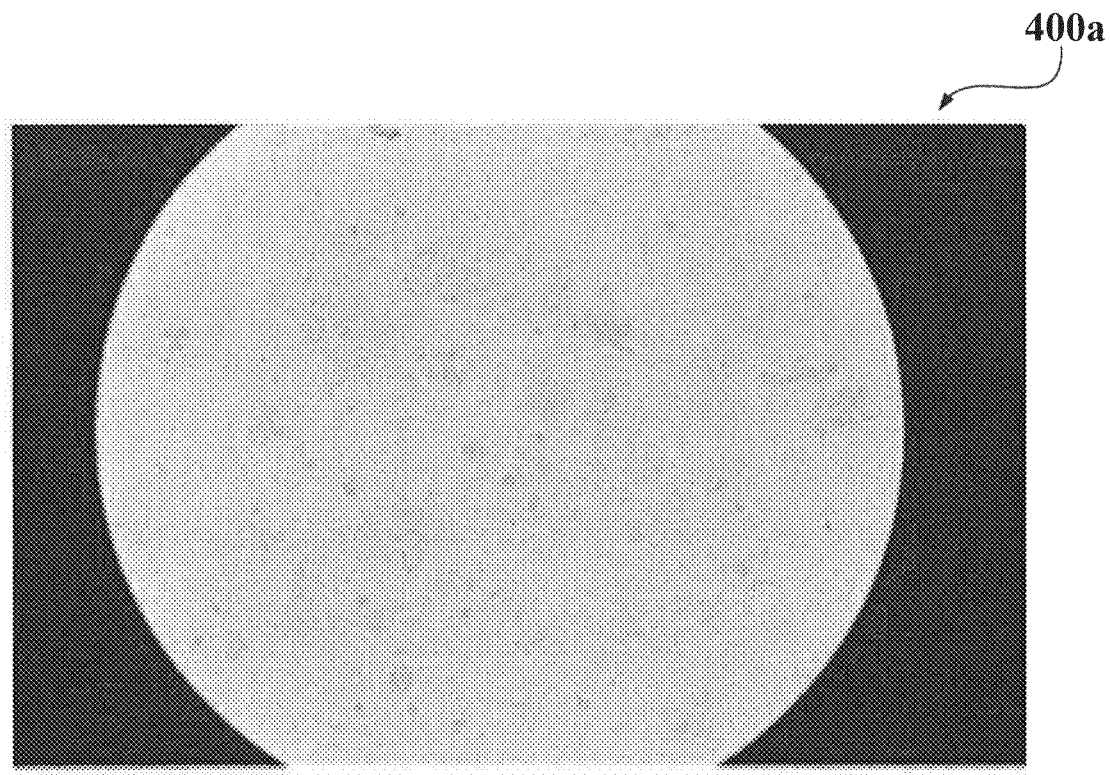
FIGS. 4a-4e show exemplary representation of images obtained during acquisition of one or more optimal images of an object in a multi-layer sample in accordance with some embodiments of present disclosure.

Further, based on the determined values of the first focal depth and the second focal depth, the image capturing unit 102 captures the plurality of images 207 at depths varying from the first focal depth to the second focal depth. The plurality of images 207 captured by the image capturing unit 102 may be retrieved by the image retrieving module 201. An exemplary representation of an image 400a from the plurality of images 207 is illustrated on FIG. 4a. The image 400a may be an image that is captured at a focal depth value between the first focal depth and the second focal depth.

In an embodiment of the present disclosure, the one or more other modules 205 of the optimal image acquisition system 101 may comprise a focal depth varying module (not shown in the figure). The focal depth varying module may be configured to determine the first focal depth and the second focal depth of the image capturing unit 102. Also, the optimal image acquisition system 101 may be configured to vary the focal depth at the predefined depth size from the first focal depth to the second focal depth.

Upon capturing the plurality of images 207, the object identification module 202 identifies the one or more objects associated with the multi-layer sample 105 in the FOV. For the identification, the cumulative foreground mask 210 of the FOV is obtained based on adaptive thresholding performed on the foreground image 212 of the FOV. For obtaining the foreground image 212, the foreground estimate 211 associated with each of the plurality of images 207 of the FOV is obtained based on background modelling performed on corresponding image from the plurality of images 207. Further, cumulative addition of the foreground estimate 211 associated with each of the plurality of images 207 is performed to obtain the foreground image 212 of the FOV. Upon obtaining the cumulative foreground mask 210, contour detection may be performed on the cumulative foreground mask 210 of the FOV to obtain the one or more object masks 213, corresponding to the one or more objects 209.

Figure 4B:
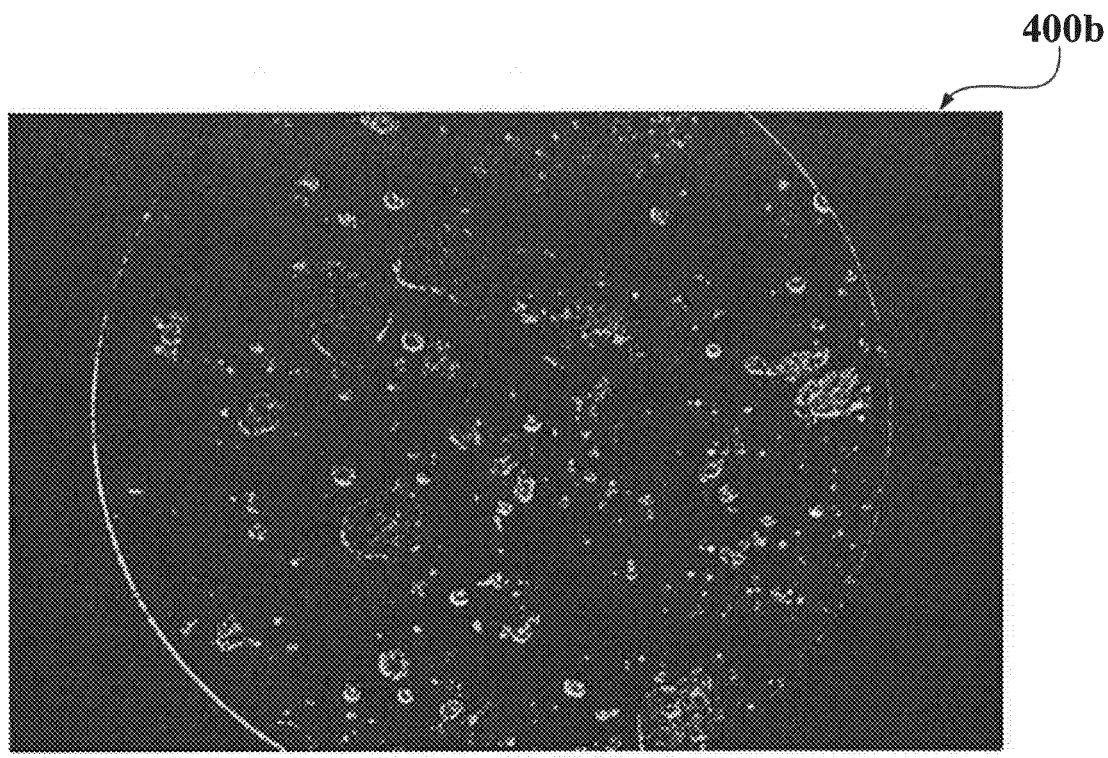

Consider the image 400a from the plurality of images 207. The background modelling of the image 400a may be performed for determining the foreground estimate 211 of the image 400a. In an embodiment, by background modelling, a background estimate of the image 400a may be obtained and further the background estimate may be complemented or negated to obtain the foreground estimate 211 of the image 400*a*. An exemplary representation of the foreground estimate 400*b* of the image 400*a* is illustrated in FIG. 4*b*. In the foreground estimate 400*b*, pixel value of background of the image may be '0' and pixel value of foreground of the image may be '1'. By obtaining the foreground estimate 400*b*, the foreground provided with the pixel value '1' may be detected to be associated with the one or more objects 209 in the image 400*a* from the plurality of images 207. A foreground estimate 211, similar to the foreground estimate 400*b*, may be obtained for other plurality of images 207. One or more known background modelling techniques, known to the person skilled in the art, may be implemented for retrieving the foreground estimate for each of the plurality of images. In an embodiment, the one or more known background modelling techniques may include, but are not limited to, background subtraction method, neural networks method, binary classifiers method, convolutional neural networks method and so on.

Figure 4C:
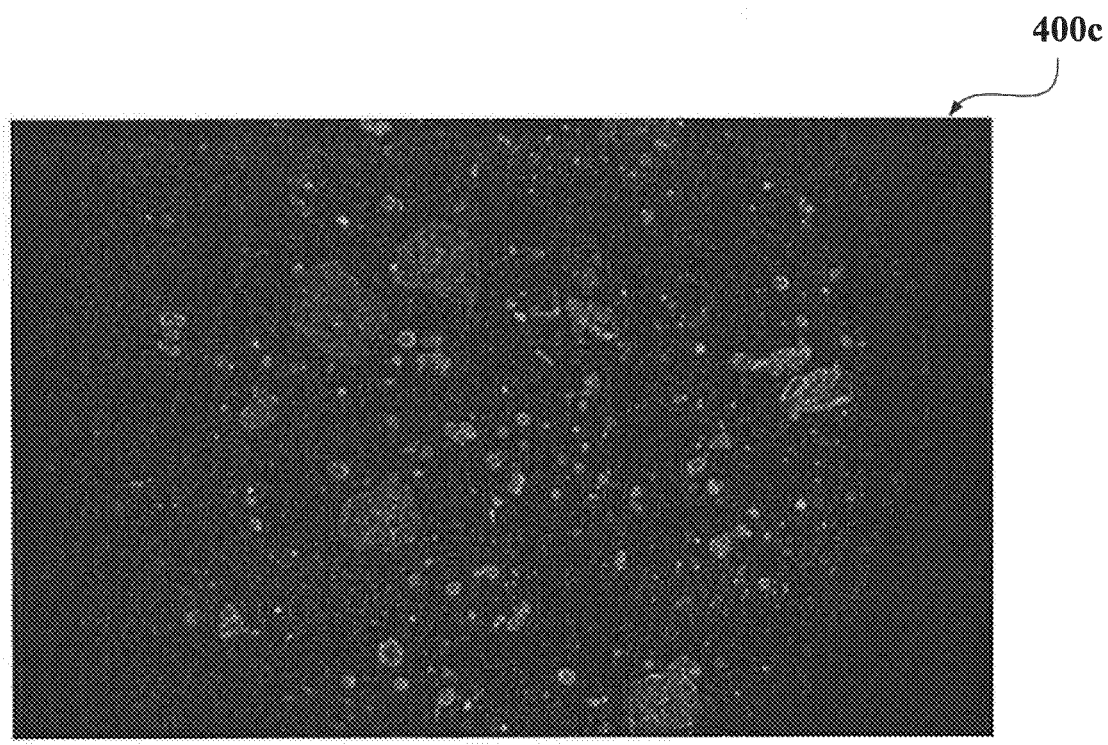

Further, the cumulative addition of the foreground estimate 211 of each of plurality of images 207 of the FOV may be performed to obtain the foreground image 212 of the FOV. An exemplary illustration of a foreground image 400*c* of the FOV is provided in FIG. 4*c*. In embodiment, the foreground image 400*c* of the FOV may be computed using equation 5, given below:

$$FM = \sum_{j=0}^{n} FG_{ij} \quad (5)$$

where, FM is the foreground image 212 of the FOV; and $FG_{ij}$ is the foreground estimate 211 associated with $j^{th}$ images from the plurality of images 207 of $i^{th}$ FOV in the multi-layer sample 105.

The foreground image 212 may be obtained to represent foreground pixels associated with the plurality of images 207, in a single image. By performing the cumulative addition, the foreground pixels associated with each of the plurality of images at different focal depth may be captured and represented in the single image.

Further, adaptive thresholding of the foreground image 400*c* may be performed for obtaining the cumulative foreground mask 210 of the FOV. An exemplary representation of the cumulative foreground mask 400*d* may be provided in FIG. 4*d*. The one or more techniques of adaptive thresholding, known to a person skilled in the art, may be performed for obtained the cumulative foreground mask 210 for each of one or more FOVs in the multi-layer sample 105.

Figure 4D:
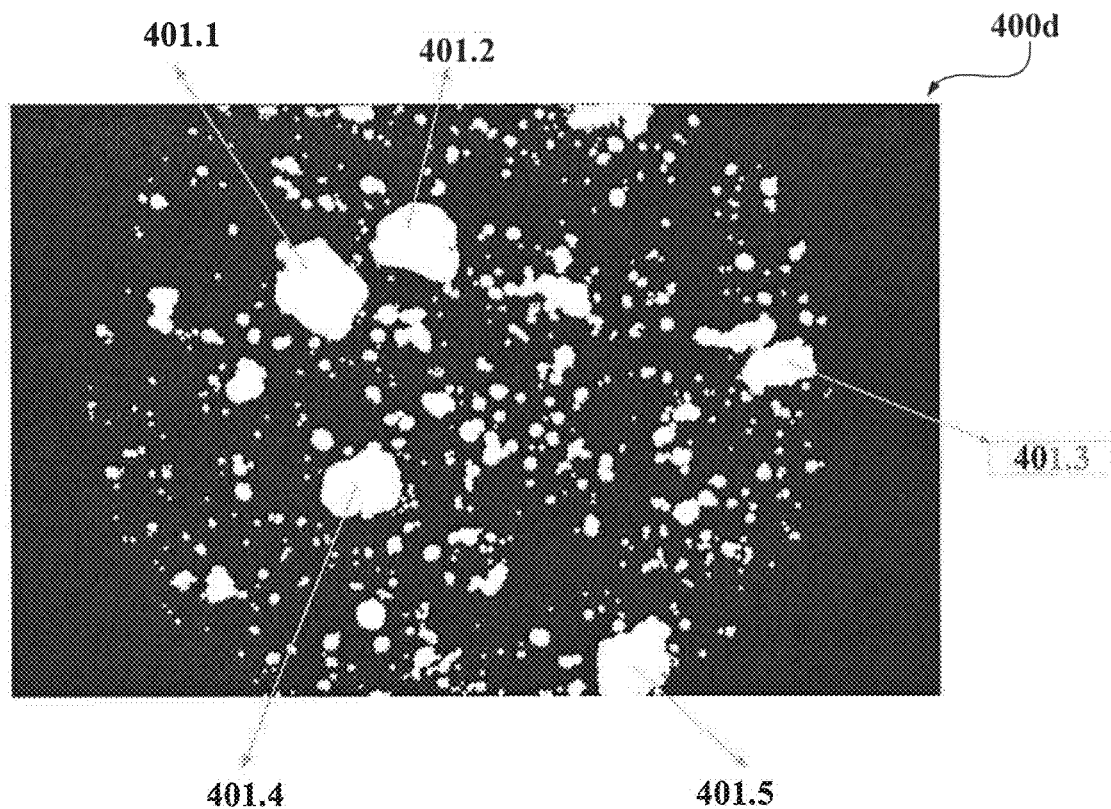

Contour detection of the cumulative foreground mask 210 may be performed to obtain the one or more objects masks 213 corresponding to the one or more objects 209. An exemplary representation of the one or more object masks 401.1 . . . 401.5 is illustrated in FIG. 4*d*. In an embodiment, by performing the contour detection, the one or more object masks 401.1 . . . 401.5 may be detected. Thereby, the contours 214 of the one or more objects 209 may also be obtained. Each of the one or more object masks 213 may relate to corresponding objects in the FOV. In an embodiment, the contour detection may also be referred to as edge detection and the contours may also be referred to as edges. One or more techniques, known to a person skilled in the art, may be implemented in the present disclosure for the contour detection.

Figure 4E:
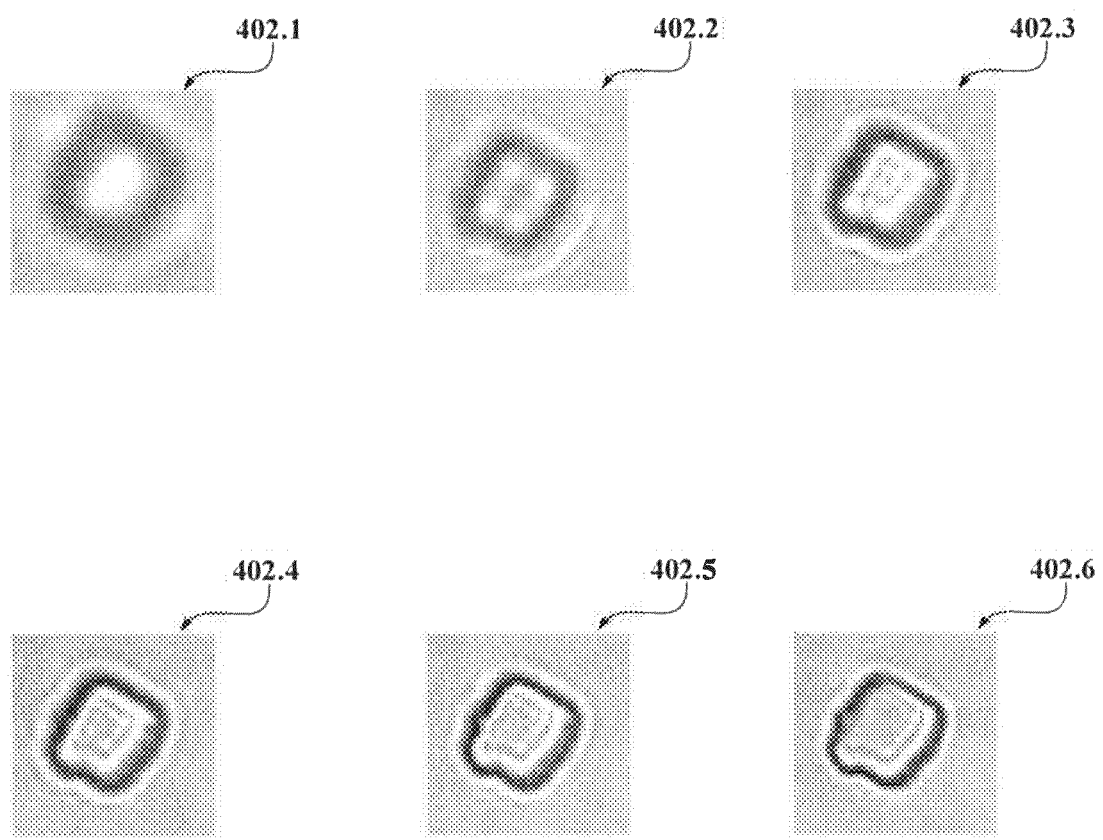

Further, the sharpness 215 of each of the plurality of images 207 associated with each of the one or more object masks 213 may be computed by the sharpness computing module 203. Consider the object mask 401.1 from the plurality of object masks 401.1 . . . 401.5. An exemplary representation of plurality of the images 402.1 . . . 402.6 associated with the object mask 401.1 is illustrated FIG. 4*e*. The plurality of images 402.1 . . . 402.6 may be obtained at different focal depths of the multi-layer sample 105. Variation of the sharpness 215 of each the plurality of images 402.1 . . . 402.6 is illustrated in FIG. 4*e*. Numerical values of the sharpness 215 of each of the plurality of images 402.1 . . . 402.6 may be computed based on the contours obtained by performing the contour detection. For example, the sharpness 215 of each of the plurality of the images 402.1 . . . 402.6 is computed based on the contours 214 obtained by performing the contour detection on the image 400*d*. One or more techniques, known to a person skilled in the art may be implemented for the computing the sharpness 214 of each of the plurality of images 207. In an embodiment, the sharpness 215 of each of the plurality of images 402.1 . . . 402.6 may be computed using Laplacian based method. In an embodiment, Variance of Laplacian value associated with each of the plurality of images 402.1 . . . 402.6 may be computed using equations 1 and 2 of the present disclosure. In an embodiment, by using the Laplacian based method for determining the sharpness 214, edge strength associated with edges of the one or more objects 209 may be obtained. Other one or more techniques may include, but are not limited to, wavelet-transform-based method, discrete-cosine-transform based method, image statistics based method, texture based method and so on.

Based on the computed sharpness 215 for each of the plurality of images 207, the one or more optimal images 216 from the plurality of images 207 for each of the one or more objects 209 in the FOV may be selected by the optimal image selection module 204. In an embodiment, one or more images from the plurality of images 207 with greater values of the sharpness 215 may be selected to be the one or more optimal images 216. Thereby, the sharpness 215 of the one or more optimal images 216 selected from the plurality of images 207 is greater than sharpness 215 of other plurality of images 207. In an embodiment, value of sharpness 215 of each of the plurality of images 207 may be compared with a predefined sharpness threshold value for selecting the one or more optimal images 216.

For example, from FIG. 4*e*, consider the sharpness 215 of the image 402.1 is 67, the sharpness 215 of the image 402.2 is 201, the sharpness 215 of the image 402.3 is 611, the sharpness 215 of the image 402.4 is 1152, the sharpness 215 of the image 402.5 is 1870 and the sharpness 215 of the image 402.6 is 2300. Consider the predefined sharpness threshold value may be 2000. The one or more optimal images 216 selected for the object mask 401.1 may be the image 402.6, because the sharpness 215 of the image 402.6 is greater than the predefined sharpness threshold value. Selected image i.e., the image 402.6 may be optimal representation of the object associated with the object mask 401.1, from one or more objects 209. Consider the predefined sharpness threshold value to be 500. The one or more optimal images 216 selected for the object mask 401.1 may be the images 402.4, 402.5 and 402.6. When two or more optimal images 216 are selected for an object from the one or more objects 209, the two or more optimal images 216 may be reconstructed to obtain the optimal representation of the object.

In an embodiment of the present disclosure, the one or more other modules 205 of the optimal image acquisition system 101 may comprise a positioning module (not shown in the figure). The positioning module may be configured to position the image capturing unit 102 at the homing position for capturing the plurality of images 207.

The other data 217 may store data, including temporary data and temporary files, generated by modules for performing the various functions of the optimal image acquisition system 101. The one or more modules 108 may also include other modules 205 to perform various miscellaneous functionalities of the optimal image acquisition 101. It will be appreciated that such modules may be represented as a single module or a combination of different modules.

Figure 3A:
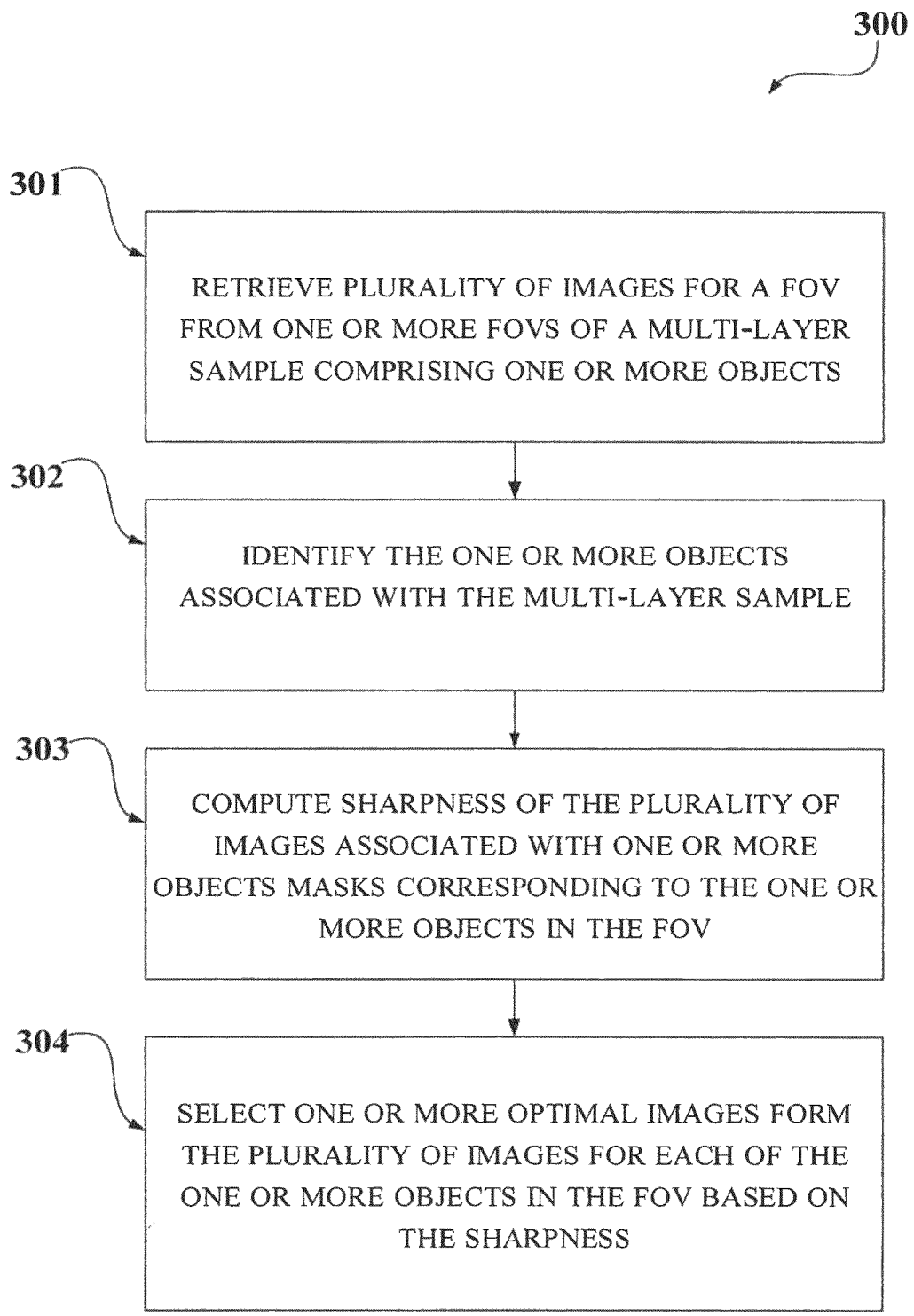
FIG. 3a illustrates a flowchart showing an exemplary method for acquisition of one or more optimal images of an object in a multi-layer sample in accordance with some embodiments of present disclosure.

FIG. 3a illustrates a flowchart showing an exemplary method for the acquisition of the one or more optimal images of the object in the multi-layer sample in accordance with some embodiments of present disclosure.

At block 301, the image retrieving module 201 retrieves the plurality of images 207 for the FOV of the multi-layer sample comprising the one or more objects. The plurality of images is captured by varying the focal depth 208 of the image capturing unit 102 associated with the optimal image acquisition system 101. In an embodiment, the focal depth of the image capturing unit 102 is varied at the predefined step size from the first focal depth to the second focal depth to capture the plurality of images 207.

Figure 3B:
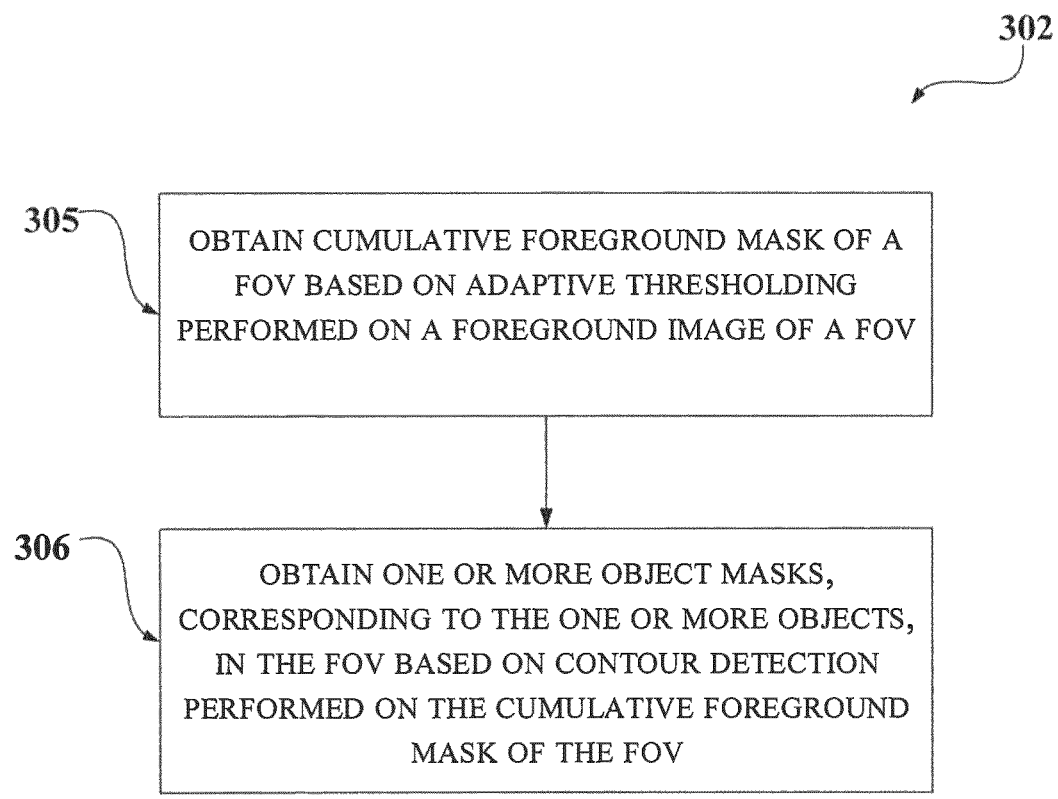
FIG. 3b illustrates a flowchart showing an exemplary method for identifying one or more objects associated with a multi-layer sample in accordance with some embodiments of present disclosure.
Figure 3C:
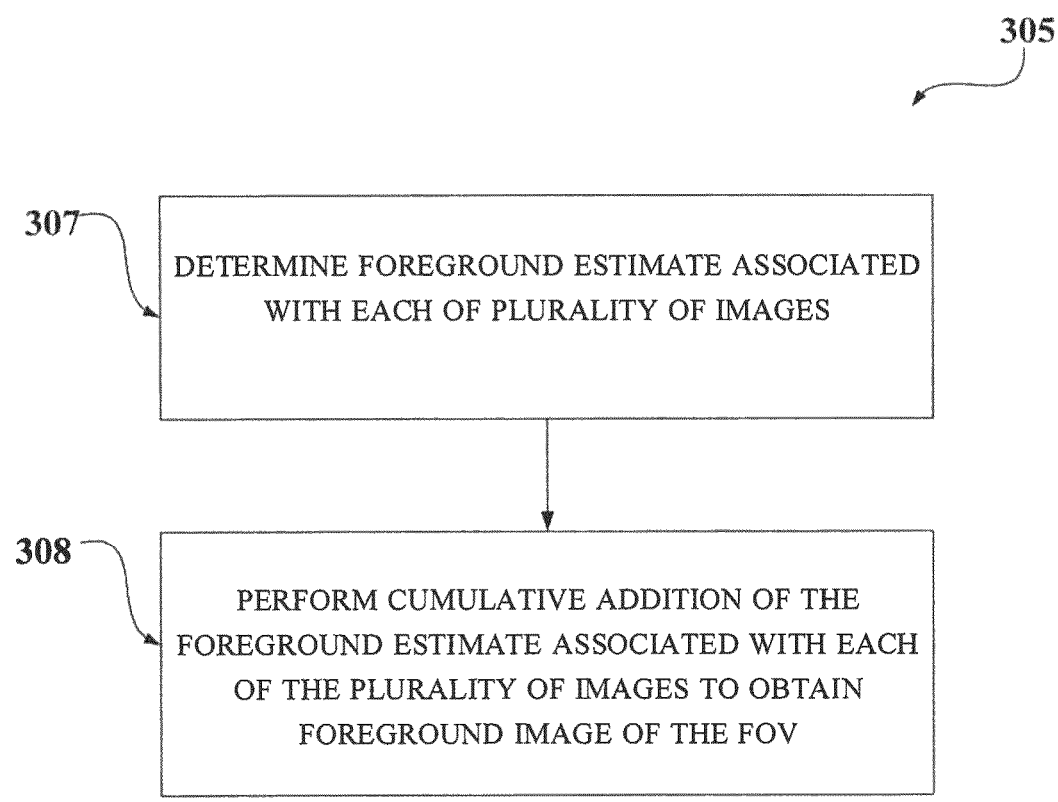
FIG. 3c illustrates a flowchart showing an exemplary method for obtaining foreground image of FOV for cumulative foreground mask in accordance with some embodiments of present disclosure.

At block 302, the object identification module 202 identifies the one or more objects associated with the multi-layer sample in the FOV. FIG. 3b illustrates a flowchart showing an exemplary method for identifying the one or more objects 209 associated with the multi-layer sample 104 in accordance with some embodiments of present disclosure. At block 305 of FIG. 3b, the object identification module 202 obtains the cumulative foreground mask 210 of the FOV based on adaptive thresholding performed on the foreground image 212 of the FOV. A flowchart showing an exemplary method for obtaining the foreground image 212 of the FOV is illustrated in FIG. 3c. At block 307 of FIG. 3c, the object identification module 202 determines the foreground estimate 211 associated with each of the plurality of images 207 of the FOV. In an embodiment, the foreground estimate of each of the plurality of images 207 may be determined based on the background modelling performed for corresponding image from the plurality of images 207. Further, at block 309 of FIG. 3c, the object identification module 202 performs cumulative addition of the foreground estimate 211 associated with each of the plurality of images 207 to obtain the foreground image 212 of the FOV. In an embodiment, the foreground image 212 obtained by performing the cumulative addition may provide accurate foreground estimate 211 of the FOV. At block 306 of FIG. 3b, the object identification module 202 obtains the one or more object masks 213, corresponding to the one or more objects 209, in the FOV based on contour detection performed on the cumulative foreground mask 210 of the FOV, for identifying the one or more objects.

Referring back to FIG. 3a, at block 303, the sharpness computing module 203 computes the sharpness 215 of each of the plurality of images 207 associated with each of the one or more object masks 213 which is obtained by the object identification module 202.

At block 304, the optimal image selection module 204 selects the one or more optimal images 216 from the plurality of images 207 for each of the one or more objects 213 in the FOV based on the computed sharpness 215.

As illustrated in FIGS. 3a, 3b and 3c, the methods 300, 302 and 305 may include one or more blocks for executing processes in the optimal image acquisition system 101. The methods 300, 302 and 305 may be described in the general context of computer executable instructions. Generally, computer executable instructions can include routines, programs, objects, components, data structures, procedures, modules, and functions, which perform particular functions or implement particular abstract data types.

The order in which the methods 300, 302 and 305 are described may not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

Computing System

Figure 6:
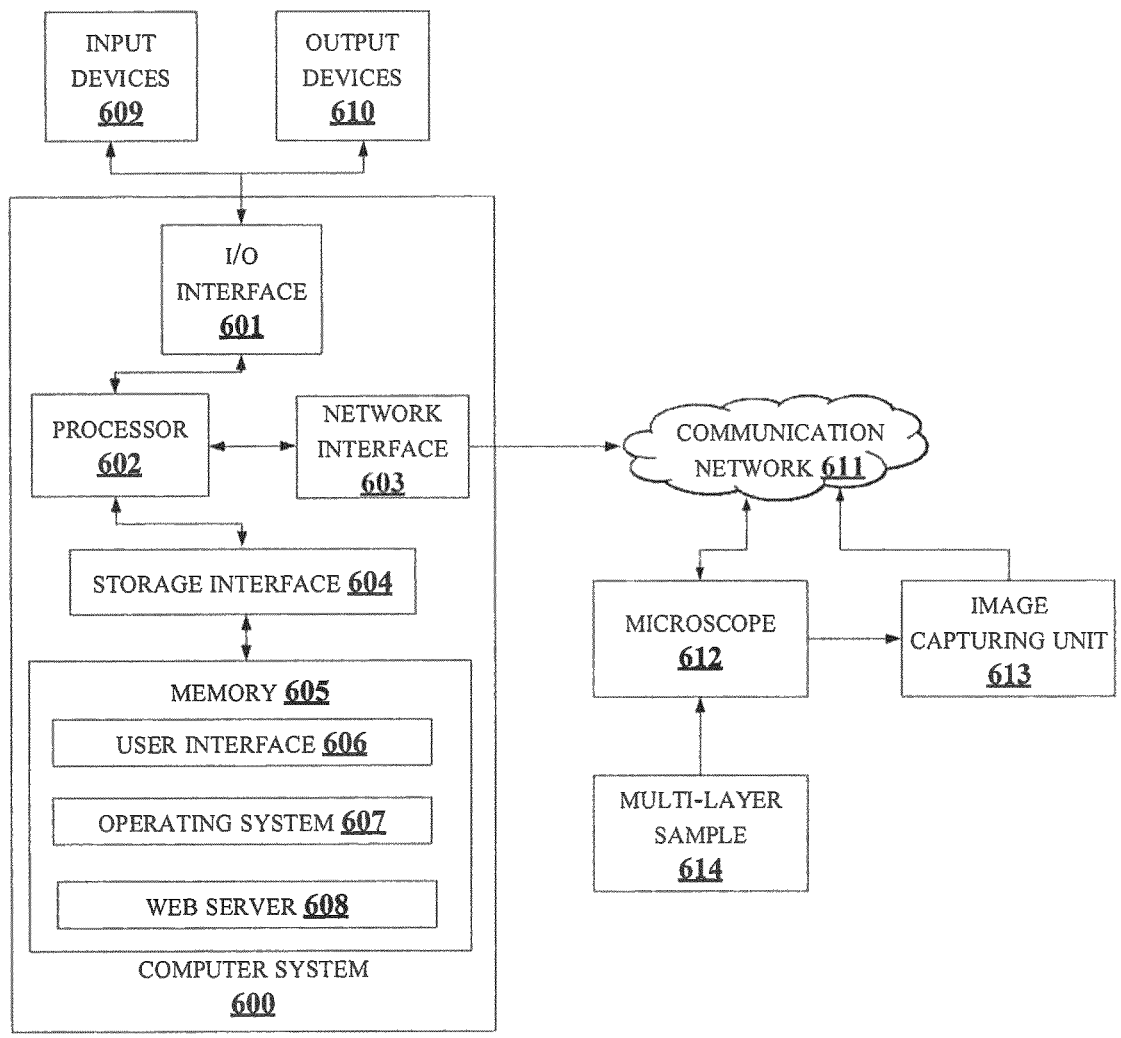
FIG. 6 illustrates a block diagram of an exemplary computer system for implementing embodiments consistent with the present disclosure.

FIG. 6 illustrates a block diagram of an exemplary computer system 600 for implementing embodiments consistent with the present disclosure. In an embodiment, the computer system 600 is used to implement the application managing system 101. The computer system 600 may include a central processing unit ("CPU" or "processor") 602. The processor 602 may include at least one data processor for executing processes in Virtual Storage Area Network. The processor 602 may include specialized processing units such as, integrated system (bus) controllers, memory management control units, floating point units, graphics processing units, digital signal processing units, etc.

The processor 602 may be disposed in communication with one or more input/output (I/O) devices 609 and 610 via I/O interface 601. The I/O interface 601 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 601, the computer system 600 may communicate with one or more I/O devices 609 and 610. For example, the input devices 609 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output devices 610 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 600 consists of the optimal image acquisition system 101. The processor 602 may be disposed in communication with the communication network 611 via a network interface 603. The network interface 603 may communicate with the communication network 611. The network interface 603 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 611 may include, without limitation, a direct interconnection, local area network (LAN), wide area network (WAN), wireless network (e.g., using Wireless Application Protocol), the Internet, etc. Using the network interface 603 and the communication network 611, the computer system 600 may communicate with microscope 612 and an image capturing unit 613 for acquisition of one or more optimal images of one or more objects in a multi-layer sample 614. The network interface 603 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 611 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 602 may be disposed in communication with a memory 605 (e.g., RAM, ROM, etc. not shown in FIG. 6) via a storage interface 604. The storage interface 604 may connect to memory 605 including, without limitation, memory drives, removable disc drives, etc., employing connection protocols such as, serial advanced technology attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 605 may store a collection of program or database components, including, without limitation, user interface 606, an operating system 607 etc. In some embodiments, computer system 600 may store user/application data 606, such as, the data, variables, records, etc., as described in this disclosure. Such databases may be implemented as fault-tolerant, relational, scalable, secure databases such as Oracle or Sybase.

The operating system 607 may facilitate resource management and operation of the computer system 600. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

Advantages

An embodiment of the present disclosure provides optimal representation of objects in a multi-layer sample which may be used for easy analysis and classification of the objects.

An embodiment of the present disclosure provides an accuracy technique for identifying objects in a multi-layer sample.

An embodiment of the present disclosure identifies smaller objects and objects at deeper depth by performing cumulative addition of foreground estimates.

An embodiment of the present disclosure provisions to clearly identify objects one below the other in a FOV.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media may include all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as, an optical fibre, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" includes non-transitory computer readable medium, hardware logic, and/or transmission signals in which code may be implemented. A device in which the code implementing the described embodiments of operations is encoded may include a computer readable medium or hardware logic. Of course, those skilled in the art will recognize that many modifications may be made to this configuration without departing from the scope of the invention, and that the article of manufacture may include suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIGS. 3a, 3b and 3c show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Referral numerals:

| Reference Number | Description |
| --- | --- |
| 100 | Environment |
| 101 | Optimal image acquisition system |
| 102 | Image capturing unit |
| 103 | Microscope |
| 104 | Stage |

-continued

Referral numerals:

| Reference Number | Description |
| --- | --- |
| 105 | Multi-layer sample |
| 106 | Processor |
| 107 | I/O network |
| 108 | Modules |
| 109 | Memory |
| 201 | Image retrieving module |
| 202 | Object identification module |
| 203 | Sharpness computing module |
| 204 | Optimal image selection module |
| 205 | Other modules |
| 206 | Data |
| 207 | Images data |
| 208 | Focal depth data |
| 209 | Object data |
| 210 | Cumulative foreground mask data |
| 211 | Foreground estimate data |
| 212 | Foreground image data |
| 213 | Object mask data |
| 214 | Contour data |
| 215 | Sharpness data |
| 216 | Optimal image data |
| 217 | Other data |
| 401.1 ... 401.5 | One or more object masks |
| 600 | Computer System |
| 601 | I/O interface |
| 602 | Processor |
| 603 | Network Interface |
| 604 | Storage Interface |
| 605 | Memory |
| 606 | User Interface |
| 607 | Operating System |
| 608 | Web Server |
| 609 | Input Devices |
| 610 | Output Devices |
| 611 | Communication Network |
| 612 | Microscope |
| 613 | Image capturing unit |
| 614 | Multi-layer sample |

We claim:

1. A method for acquisition of one or more optimal images of an object in a multi-layer sample, comprising:

retrieving, by an optimal image acquisition system, plurality of images for a Field Of View from one or more FOVs of a multi-layer sample comprising one or more objects, wherein each of the plurality of images are captured by varying focal depth of an image capturing unit associated with the optimal image acquisition system;

identifying, by the optimal image acquisition system, the one or more objects associated with the multi-layer sample in the FOV, wherein the identification comprises:

obtaining a cumulative foreground mask of the FOV based on adaptive thresholding performed on a foreground image of the FOV; and obtaining one or more object masks, corresponding to the one or more objects, in the FOV based on contour detection performed on the cumulative foreground mask of the FOV, for identifying the one or more objects;

computing, by the optimal image acquisition system, sharpness of each of the plurality of images associated with each of the one or more object masks; and selecting, by the optimal image acquisition system, one or more optimal images from the plurality of images for each of the one or more objects in the FOV based on the sharpness, for acquisition of the one or more optimal images of an object from the one or more objects in the multi-layer sample.

2. The method as claimed in claim 1, wherein the obtaining the cumulative foreground mask of the FOV, comprises:
   determining a foreground estimate associated with each of the plurality of images of the FOV; and
   performing cumulative addition of the foreground estimate associated with each of the plurality of images to obtain the foreground image of the FOV, for obtaining the cumulative foreground mask.

3. The method as claimed in claim 2, wherein the foreground estimate associated with each of the plurality of images is obtained based on background modelling performed on corresponding image from the plurality of images.

4. The method as claimed in claim 1, wherein the image capturing unit is positioned at a homing position with respect to the multi-layer sample to capture the plurality of images.

5. The method as claimed in claim 1, wherein the focal depth of the image capturing unit is varied at a predefined step size from a first focal depth to a second focal depth to capture the plurality of images.

6. The method as claimed in claim 5, wherein at least one of the first focal depth and the second focal depth is a focal depth at which image sharpness of an image captured at corresponding focal depth is greater than a predefined image sharpness.

7. The method as claimed in claim 5, wherein the second focal depth is determined based on at least one of the first focal depth, the predefined step size and number of the plurality of images to be captured.

8. The method as claimed in claim 1, wherein the sharpness of each of the plurality of images is computed based on contours associated with corresponding one or more object masks.

9. The method as claimed in claim 1, wherein the sharpness of each of the plurality of images is computed using Laplacian based method.

10. The method as claimed in claim 1, wherein each of the captured plurality of images is corresponding frame of a video of the FOV, captured by varying the focal depth.

11. The method as claimed in claim 1, wherein the sharpness of the one or more optimal images selected from the plurality of images is greater than sharpness of other plurality of images.

12. An optimal image acquisition system for acquisition of one or more optimal images of an object in a multi-layer sample, comprises:
    a processor; and
    a memory communicatively coupled to the processor, wherein the memory stores processor-executable instructions, which, on execution, cause the processor to:
       retrieve plurality of images for a Field Of View from one or more FOVs of a multi-layer sample comprising one or more objects, wherein each of the plurality of images are captured by varying focal depth of an image capturing unit associated with the optimal image acquisition system;
       identify the one or more objects associated with the multi-layer sample in the FOV, wherein the identification comprises:
          obtain of the FOV based on adaptive thresholding performed on a foreground image of the FOV; and
          obtain corresponding to the one or more objects, in the FOV based on contour detection performed on the cumulative foreground mask of the FOV, for identifying the one or more objects;
       compute sharpness of each of the plurality of images associated with each of the one or more object masks; and
       select one or more optimal images from the plurality of images for each of the one or more objects in the FOV based on the sharpness, for acquisition of the one or more optimal images of an object from the one or more objects in the multi-layer sample.

13. The optimal image acquisition system as claimed in claim 12, wherein the obtaining the cumulative foreground mask of the FOV, comprises:
    determining a foreground estimate associated with each of the plurality of images (207) of the FOV; and
    performing cumulative addition of the foreground estimate associated with each of the plurality of images to obtain the foreground image of the FOV, for obtaining the cumulative foreground mask.

14. The optimal image acquisition system as claimed in claim 13, wherein the foreground estimate associated with each of the plurality of images is obtained based on background modelling performed on corresponding image from the plurality of images.

15. The optimal image acquisition system as claimed in claim 12, wherein the image capturing unit is positioned at a homing position with respect to the multi-layer sample to capture the plurality of images.

16. The optimal image acquisition system as claimed in claim 12, wherein the focal depth of the image capturing unit is varied at a predefined step size from a first focal depth to a second focal depth to capture the plurality of images.

17. The optimal image acquisition system as claimed in claim 16, wherein at least one of the first focal depth and the second focal depth is a focal depth at which image sharpness of an image captured at corresponding focal depth is greater than a predefined image sharpness.

18. The optimal image acquisition system as claimed in claim 16, wherein the second focal depth is determined based on at least one of the first focal depth, the predefined step size and number of the plurality of images to be captured.

19. The optimal image acquisition system as claimed in claim 12, wherein the sharpness of each of the plurality of images is computed based on contours associated with corresponding one or more object masks.

20. The method as claimed in claim 1, wherein the sharpness of each of the plurality of images is computed using Laplacian based method.

21. The optimal image acquisition system as claimed in claim 12, wherein each of the captured plurality of images is corresponding frame of a video of the FOV, captured by varying the focal depth.

22. The optimal image acquisition system as claimed in claim 12, wherein the sharpness of the one or more optimal images selected from the plurality of images is greater than sharpness of other plurality of images.

* * * * *